United States Patent
Cermak et al.

(10) Patent No.: US 6,585,602 B2
(45) Date of Patent: Jul. 1, 2003

(54) PLUNGING ASSEMBLY FOR A DRIVESHAFT

(75) Inventors: Herbert Cermak, Bessenbach (DE); Dietmar Lück, Rodgau (DE)

(73) Assignee: GKN Löbro GmbH (DE)

( * ) Notice: Subject to any disclaimer, the term of this patent is extended or adjusted under 35 U.S.C. 154(b) by 0 days.

(21) Appl. No.: 09/791,486

(22) Filed: Feb. 23, 2001

(65) Prior Publication Data

US 2001/0018369 A1 Aug. 30, 2001

(30) Foreign Application Priority Data

Feb. 24, 2000 (DE) .......................................... 100 08 556
Dec. 4, 2000 (DE) .......................................... 100 60 229

(51) Int. Cl.$^7$ ................................................. F16D 3/06
(52) U.S. Cl. .......................................... 464/167; 384/49
(58) Field of Search .................................. 464/162, 167, 464/168, 905, 906; 384/52, 49

(56) References Cited

U.S. PATENT DOCUMENTS

| | | | | |
|---|---|---|---|---|
| 2,562,729 A | * | 7/1951 | Merwin | ..................... 464/167 |
| 3,186,189 A | | 6/1965 | Cull | |
| 4,103,514 A | * | 8/1978 | Grosse-Entrup | ............. 464/167 |
| 5,489,253 A | * | 2/1996 | Ito et al. | ....................... 384/52 |
| 5,611,733 A | | 3/1997 | Jacob et al. | |
| 6,306,045 B1 | * | 10/2001 | Jacob | ........................ 464/167 |

FOREIGN PATENT DOCUMENTS

| | | | | |
|---|---|---|---|---|
| DE | 1267479 | * | 5/1968 | ................. 464/167 |
| DE | 44 19 373 C2 | | 12/1995 | |
| DE | 197 39 934 A1 | | 4/1998 | |
| FR | 1268060 | * | 6/1961 | ................. 464/167 |
| GB | 868712 | * | 5/1961 | ................. 384/49 |
| GB | 999327 | * | 7/1965 | ................. 384/49 |

* cited by examiner

Primary Examiner—Greg Binda

(57) ABSTRACT

The invention relates to a plunging assembly for a driveshaft, especially for being used in the driveline of a motor vehicle. The plunging assembly comprises a tubular outer joint part (3) with a longitudinal axis and circumferentially distributed outer running grooves (5) extending parallel to the longitudinal axis; an inner part (1) with inner running grooves (10) extending parallel to the longitudinal axis, as well as a plunging unit (2) with a cage (16) and balls (15) provided for torque transmitting purposes. Furthermore, there are provided means for delimiting the path which can be covered by the inner part (1) relative to the outer part (3) during the moving-in and moving-out motion. The means being arranged between the inner part (1) and the plunging unit (2) as well as between the plunging unit (2) and the outer part (3). The length of the inner running grooves (10) differs from that of the outer running grooves (5). This design ensures that a rolling and a sliding movement during the moving-in and moving-out motion is delimited without the balls (15) of the cage (16) being jammed and without the plunging unit being locked.

10 Claims, 4 Drawing Sheets

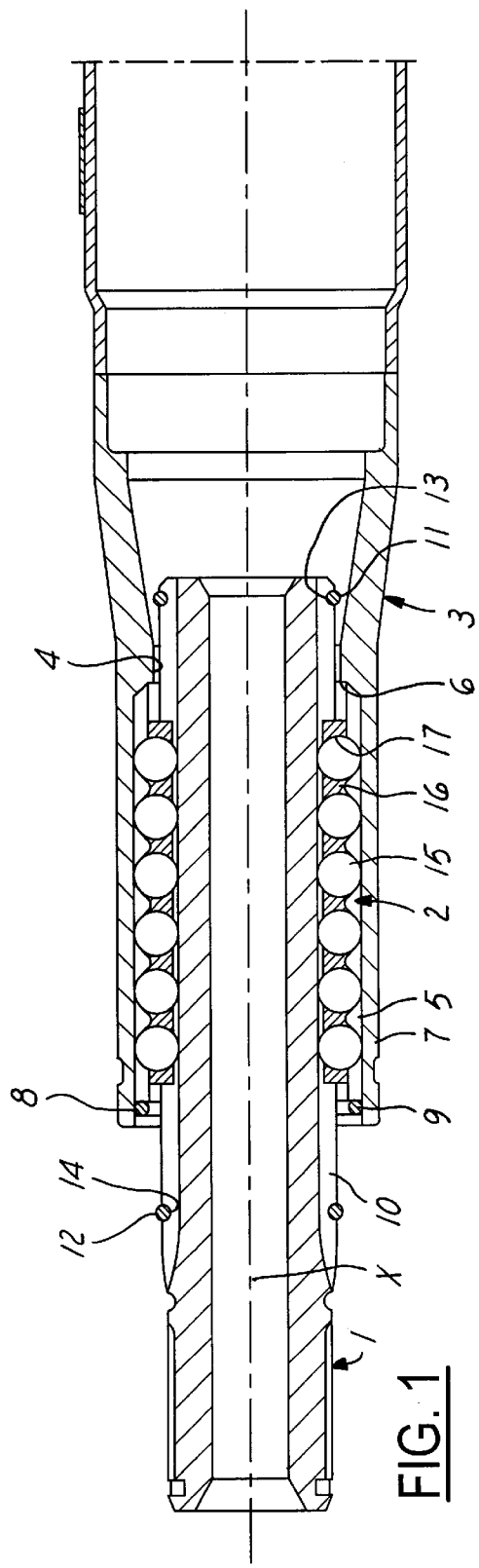
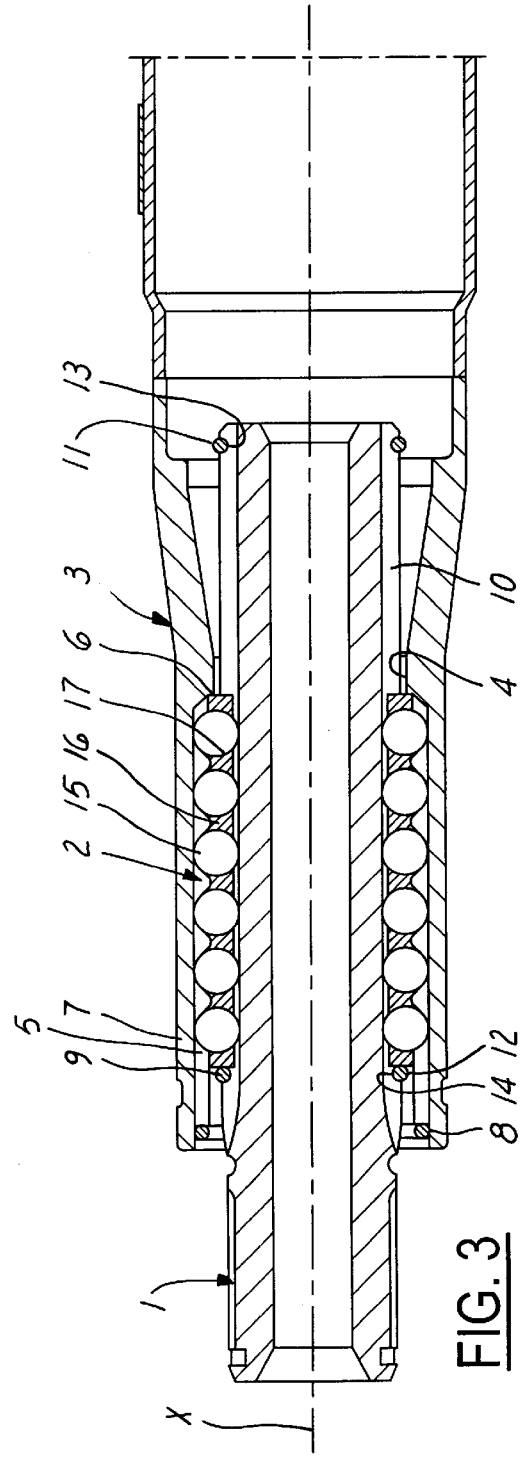
FIG. 1
FIG. 3

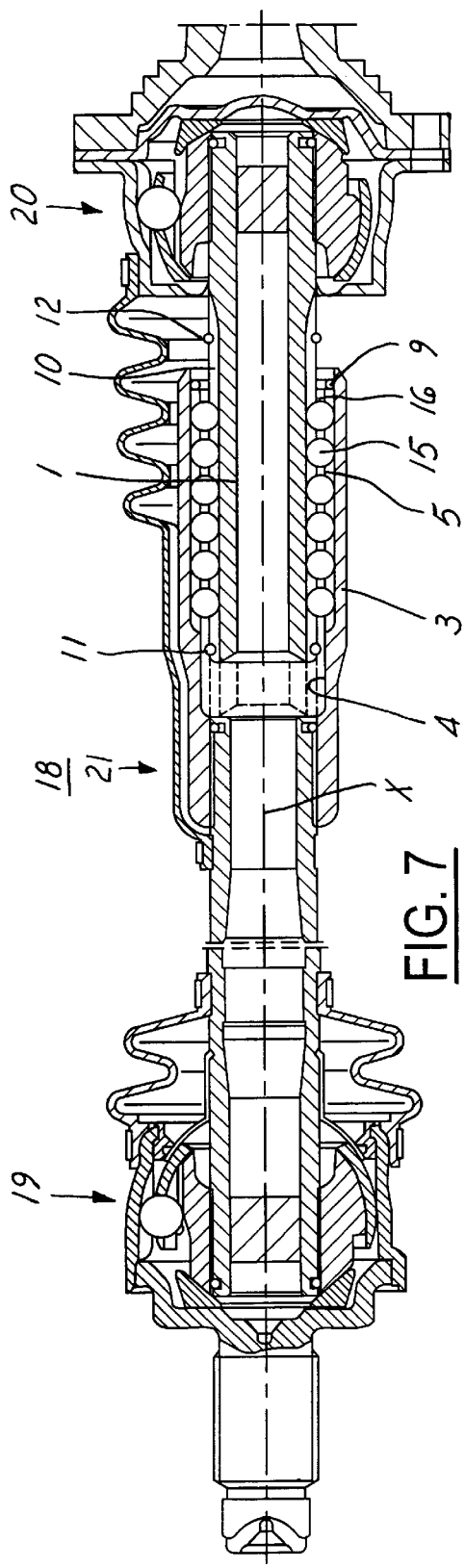
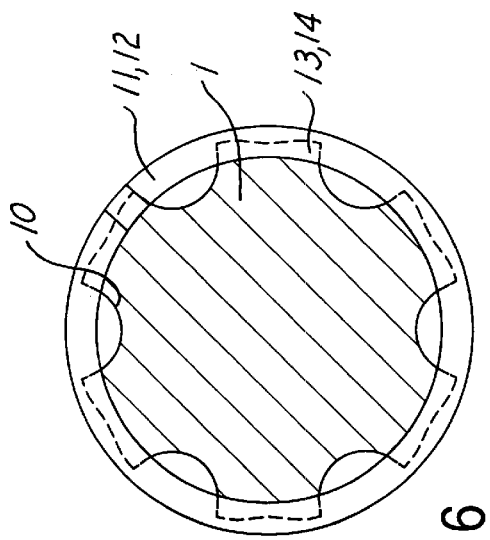
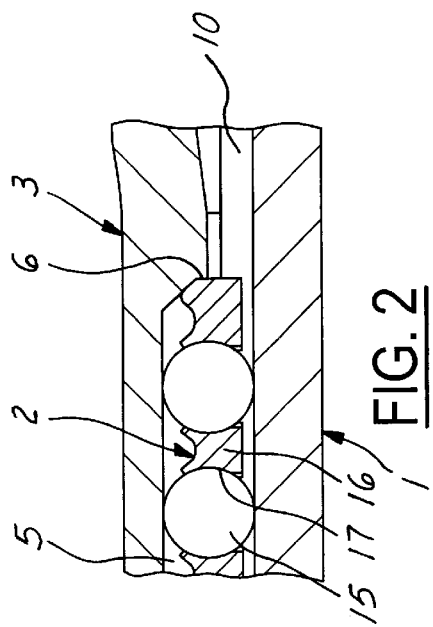

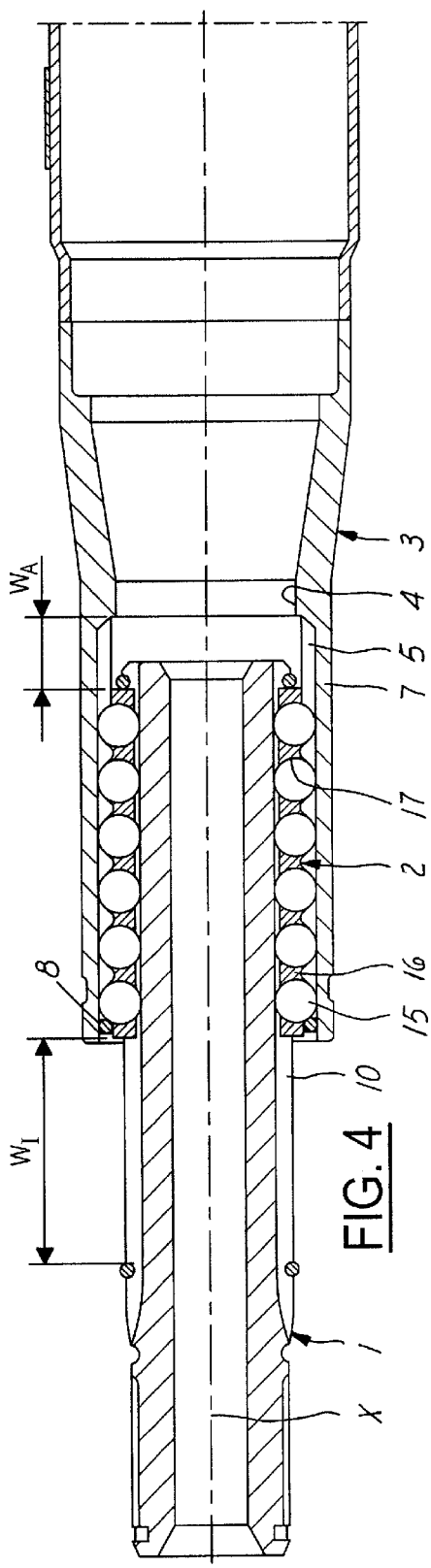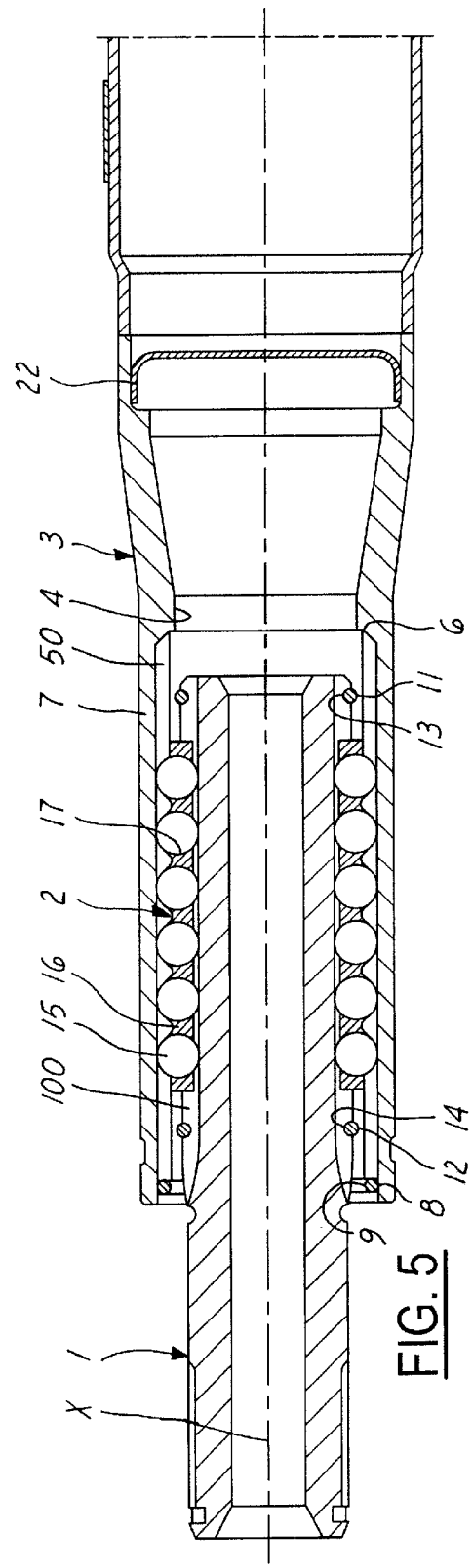

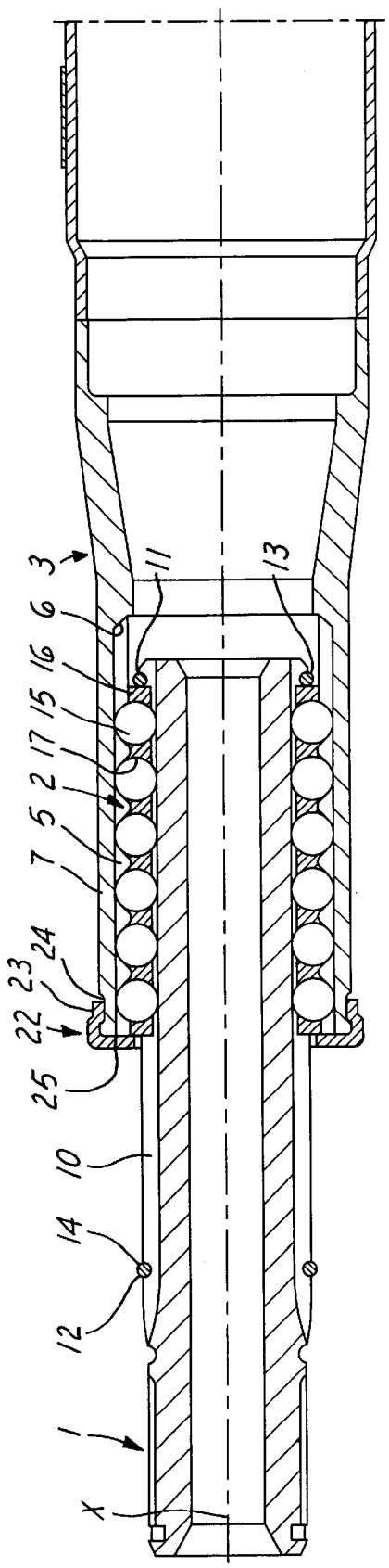
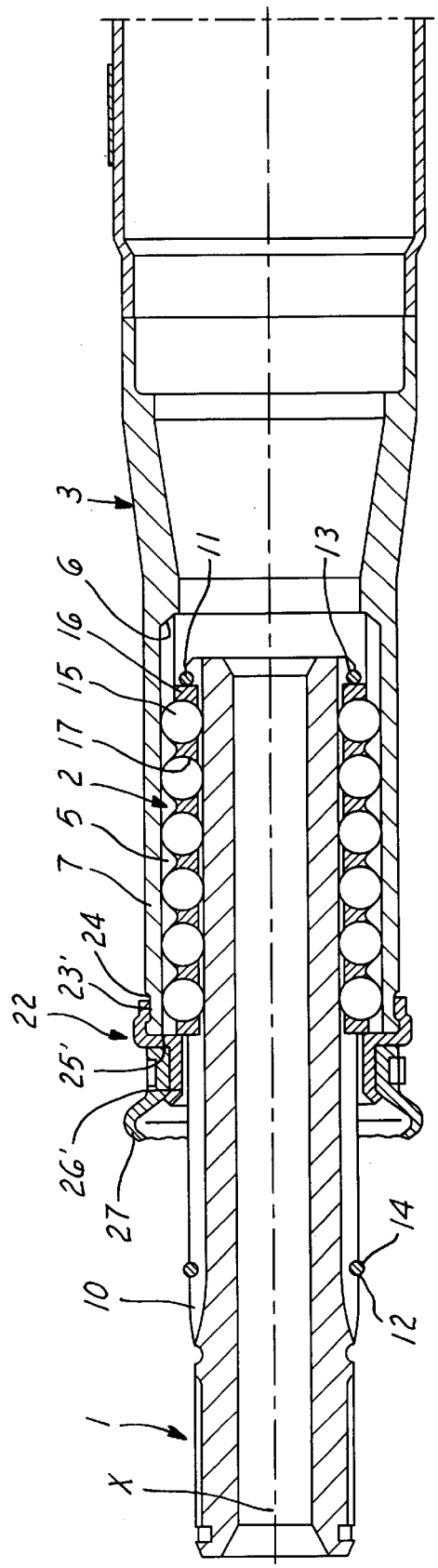
FIG. 8
FIG. 9

PLUNGING ASSEMBLY FOR A DRIVESHAFT

BACKGROUND OF THE INVENTION

The invention relates to a plunging assembly for a driveshaft, especially for being used in the driveline of a motor vehicle. The driveshaft comprises two joints which permit articulation angles only and which are connected to one another by a connecting shaft. The plunging assembly of the connecting shaft serves to compensate for any changes in the distance between the articulation centers of the joints, which changes result from positional changes of the joints.

DE 44 19 373 C2 describes such a driveshaft wherein one of the two constant velocity joints is provided with a plunging journal which is produced so as to be integral with the constant velocity joint and which, in its outer face, comprises a plurality of circumferentially distributed first running grooves extending parallel to the longitudinal axis. The connecting shaft comprises a corresponding plunging portion whose cross-section has the shape of a corrugated tube into which the plunging journal enters in an axially movable way. In the bore of the plunging portion, there are provided second running grooves which are arranged opposite the first running grooves of the plunging journal and extend parallel to the longitudinal axis. The first and second running grooves which, together form pairs, accommodate rolling contact members which are arranged one behind the other in a running groove. At the end of the plunging portion there is provided a securing ring which, when the plunging journal moves, delimits the movement of the rolling contact members in the pulling-out direction. An insert arranged in the bore of the plunging portion delimits the plunging movement of the plunging journal relative to the plunging portion in the moving-in direction. However, the design as described does not permit the outer part to cover plunging paths relative to the inner part which are longer than those normally occurring in operation. Furthermore, in the unmounted condition of the driveshaft, the plunging journal is not secured against unintentionally falling out of the plunging portion.

U.S. Pat. No. 3,186,189 shows a plunging part for a driveshaft, wherein a plunging journal is connected to a constant velocity joint and arranged inside a bore of a plunging portion of the connecting shaft. The plunging journal and the plunging portion each comprise opposed running grooves in which rolling contact members carry out rolling movements. In the moving-in direction, the movement of the plunging journal relative to the plunging portion is delimited by a plug which is positioned in the bore of the plunging portion and abuts against the plunging journal. In the pulling-out direction, the movement of the plunging journal is delimited by an annular member at the plunging portion, against which annular member there abut shoulders of the regions between two adjoining running grooves. To prevent the balls from unintentionally leaving the running grooves of the plunging journal when the plunging journal has assumed one of its end positions, securing rings are provided at both ends of the running grooves.

DE 197 39 934 A1 describes an example of a rolling contact assembly wherein the inner part of the plunging assembly is inserted into one of the joint parts of the constant velocity joint. The outer part of the constant velocity joint is firmly connected to the intermediate shaft and comprises a through-bore provided with outer running grooves which are circumferentially distributed around a longitudinal axis and which extend parallel relative to the latter. The inner part plunges into the outer part, with the outer face of the inner part having inner running grooves which are circumferentially distributed in accordance with the outer running grooves. In each of the opposed pairs of outer running grooves and inner running grooves, there is arranged a plurality of balls one behind the other along the longitudinal axis and held by a cage. The plunging movement of the plunging unit, composed of the cage and the balls, relative to the outer part is delimited by stops. When the plunging unit is stationary, the inner part can be pulled further out of the outer part than necessary under operational conditions. In the process, the balls of the plunging unit slide in the inner running grooves of the inner part. The moving-in movement of the inner part relative to the outer part is delimited in that the balls facing the intermediate shaft stop against the run-out faces of the outer running grooves of the outer part, with the inner part coming into contact with the intermediate shaft.

SUMMARY OF THE INVENTION

Accordingly, it is an object of the present invention to provide an improved plunging assembly. Another object is to provide a plunging assembly for a driveshaft having a simple design and which delimits the rolling and a sliding movement of the inner part relative to the outer part during the moving-in and moving-out processes without there being any risk of the balls of the cage being jammed in between the outer part and inner part, thus blocking the plunging unit.

In accordance with the invention, the foregoing and other objectives and advantages are achieved by a plunging assembly for a driveshaft which comprises an outer part which is arranged so as to be centered on a longitudinal axis and which, furthermore, comprises a bore which is arranged so as to be centered on the longitudinal axis and which is provided with circumferentially distributed outer running grooves which extend parallel to the longitudinal axis. The plunging assembly also includes an inner part whose outer face is provided with inner running grooves which extend parallel to the longitudinal axis and which are positioned opposite the outer running grooves. A plunging unit is also included comprising a cage which is sleeve-shaped, which is arranged coaxially around the inner part, and is positioned in the bore so as to be displaceable relative to the outer part and inner part and which, furthermore, in accordance with the pairs of opposed outer running grooves and inner running grooves, comprises apertures, as well as balls which are held in the apertures and engage the outer running grooves and the inner running grooves. Means for delimiting the path which can be covered by the inner part relative to the outer part during the moving-in motion are also provided in the form of a first moving-in stop and a second moving-in stop. Means for delimiting the path which can be covered by the inner part relative to the outer part during the moving-out motion are also provided in the form of a first moving-out stop and a second moving-out stop. The first moving-in stop and the first moving-out stop delimit the effective length of the outer running grooves with respect to the path which can be covered by the plunging unit relative to the outer part. Furthermore, the second moving-in stop and the second moving-out stop delimit the effective length of the inner running grooves with respect to the path which can be covered by the plunging unit relative to the inner part, with the length of the inner running grooves deviating from the length of the outer running grooves.

One advantage of the present invention is that the change in the length of the driveshaft occurring under operational conditions can be achieved by rolling displacement of the balls of the plunging unit. The rolling displacement path is the path which can be covered by the inner part relative to, and into, the outer part, starting from a first position wherein the plunging unit rests against a first moving-out stop as far as a position wherein the plunging unit rests against the first moving-in stop. Due to the kinematic conditions, the rolling displacement path is twice as long as the displacement path of the plunging unit between the stops. The effective length of the outer running grooves is therefore the set path covered by the plunging unit between the stops, and of the length of the plunging unit between its parts touching the two stops. If an additional set path is required, the length of the inner running grooves has to deviate from the length of the outer running grooves. If the path to be covered by the plunging unit relative to the inner part is greater than that to be covered relative to the outer part, the setting movement takes place on the inner part. On the other hand, the setting movement of the plunging unit takes place on the outer part, if the path to be covered by the plunging unit relative to the inner part is smaller than that to be covered relative to the outer part.

This design measure ensures that identical types of driveshaft can be used for certain applications, so that, first, the insertion depth of the inner part in the outer part is slidingly set, and subsequently, within the limits of the proposed path as set for the plunging unit, there takes place a rolling displacement between the outer part and the inner part. The path set additionally can also be used, for example when assembling or dismantling a driveshaft, for moving the driveshaft into a shortened position which goes beyond the standard operating positions.

By delimiting the path to be covered by the plunging unit relative to the inner part by way of a second moving-in stop and a second moving-out stop, the inner part, in the course of dismantling, is prevented from completely moving out of the outer part or from moving too far into the outer part. In particular by delimiting the path to be covered by the plunging unit relative to the inner part and outer part, the balls are prevented from reaching the region of the running groove ends where they could be jammed in between the inner part and outer part, in which case the plunging unit would be blocked.

According to another embodiment of the invention, the first moving-in stop of the plunging unit is formed by stop faces delimiting the end of the outer running grooves of the outer part, with the cage, in the moved-in condition of the plunging unit, being supported thereon in such a way that a distance exists between the stop faces of the outer running grooves and the directly adjoining balls. The cage, by way of its end face, stops against the stop faces of the outer part. In this embodiment, the balls of the plunging unit are prevented from stopping against the stop faces of the outer running grooves and from being jammed in between these and the inner running grooves of the inner part. It is also conceivable for the cage, at its end, to comprise at least one radial projection acting as a stop against the track end.

A further embodiment is provided wherein the first moving-out stop comprises a securing ring which can be firmly inserted into the bore of the outer part and which serves as a stop for the cage or the balls of the plunging unit. This embodiment allows the inner part and the plunging unit to be easily assembled with the outer part. After the inner part and the plunging unit have been slid into the outer part, the securing ring connected to the outer part near the bore aperture of same prevents the plunging unit and the inner part from sliding out of the outer part. For dismantling purposes, the securing ring is released from the outer part, so that the inner part, together with the plunging unit, can be pulled out of the outer part.

The first moving-out stop can also comprise an annular element which is arranged at that end of the outer part into which the inner part is inserted. Furthermore, the annular element comprises a circular-ring-shaped stop face which points radially inwardly. The annular element is preferably produced by a non-chip forming machining method, such as by rolling. If the annular element is produced by rolling, it can be directly formed on to the outer part, so that the circular-ring-shaped stop face is formed while the annular element is formed on. In addition, the annular element can comprise a seat for a convoluted boot.

In a further embodiment, the second moving-out stop of the plunging assembly comprises a securing ring which is connected to the inner part end located in the outer part, which also serves as a stop for the cage or the balls of the plunging unit and which is arranged in front of the end of the inner running grooves. The second moving-out stop delimits the sliding displacement path of the plunging unit relative to the inner part. The inner part is thus prevented from moving out of the outer part during dismantling in an uncontrolled way.

A further embodiment provides that the second moving-in stop comprises a securing ring which is secured at that end of the inner running grooves of the inner part which emerges from the outer part, which, furthermore, serves as a stop for the cage or the balls of the plunging unit and which is arranged in front of the end of the inner running grooves. The second moving-in stop delimits the sliding displacement path of the inner part relative to the plunging unit and to the outer part. During the moving-in movement of the inner part, the securing ring stops against the cage of the plunging unit, thus preventing the inner part from slidingly moving into the outer part and also preventing the balls from being jammed in between the running-out faces of the inner grooves of the inner part and the outer grooves of the outer part.

According to a further embodiment of the invention, there are provided means, in the form of a plate metal cup, for sealing the bore of the outer part, the means preventing the lubricant from flowing out of the plunging unit through the bore of the outer part when the driveshaft is in operation. At the plunging assembly end facing the joint, there is provided a convoluted boot which seals the aperture between the outer part and the joint and the inner part respectively.

A particularly preferred embodiment of the invention provides that the delimited path to be covered by the plunging unit relative to the inner part is longer than the delimited path to be covered by the plunging unit relative to the outer part. The advantage of this design measure is that in the case of a maximum rolling and sliding displacement path, the length of the outer running grooves of the outer part is minimal.

Other objects and advantages of the invention will become apparent upon reading the following detailed description and appended claims, and upon reference to the accompanying drawings.

BRIEF DESCRIPTION OF THE DRAWINGS

The invention will be better understood from reading the specification which will follow, given solely by way of example with reference to the appended drawings, in which:

FIG. 1 is a longitudinal section through an inventive plunging assembly in the operating position.

FIG. 2 shows the first moving-in stop according to FIG. 1 in the form of a detail.

FIG. 3 is a longitudinal section through the plunging assembly according to FIG. 1 in its maximum moved-in position.

FIG. 4 is a longitudinal section of the plunging assembly according to FIG. 1 in its maximum moved-out position.

FIG. 5 is a longitudinal section through a plunging assembly wherein the setting movement takes place in the outer part.

FIG. 6 is a cross-section V—V of an inner part according to FIG. 5.

FIG. 7 is a longitudinal section through a driveshaft having a plunging assembly.

FIG. 8 is a longitudinal section through a plunging assembly having a moving-out stop in the form of an annular element.

FIG. 9 is a longitudinal section through a plunging assembly having a moving-out stop in the form of an annular element with a seat for a convoluted boot.

DETAILED DESCRIPTION OF THE INVENTION

FIG. 1 shows a plunging assembly for a driveshaft which comprises an inner part 1, a plunging unit 2 and an outer part 3. The outer part 3 is arranged so as to be centered on a longitudinal axis X and comprises a bore 4 which is also centered on the longitudinal axis X. Said bore 4 comprises circumferentially distributed outer running grooves 5 which extend parallel relative to the longitudinal axis. The outer running grooves 5 extend from the bore aperture to the stop face 6 inside the bore 4. The outer running grooves 5 comprise a curved cross-section. In the wall 7 of the outer part 3, near the bore aperture, there is provided a groove 8 which extends perpendicularly relative to the longitudinal axis and which accommodates a securing ring 9.

The inner part 1 is connected in a rotationally fast way to the outer part by way of the plunging unit 2. In the outer face of the inner part 1 there are provided inner running grooves 10 which extend parallel to the longitudinal axis X and are positioned opposite the respective outer running grooves 5. The inner running grooves 10 of the inner part 1 are longer than the outer running grooves 5 of the outer part 3 and are delimited by two securing rings 11, 12 which engage a groove 13, 14 arranged in the outer face of the inner part 1. The first groove 13 and the first securing ring 11 are arranged near the end into which there enters the outer part 3. The second groove 14 or the second securing ring 12 delimits that end of the inner running grooves 10 which faces away from the bore 4 of the outer part 3.

Each pair of opposed inner running grooves 10 and outer running grooves 5 accommodates a plurality of balls 15 which are arranged one behind the other along the longitudinal axis, which are held by a cage 16 and which, from the apertures 17 of the cage 16, radially inwardly and outwardly engage the outer running grooves 5 and inner running grooves 10 respectively, The cage 16 is shaped sleeve-like and, together with the balls 15, forms the plunging unit 2.

The inner part 1 is axially displaceable relative to the outer part 3 by way of the plunging unit 2. In the course of the operation of the driveshaft and the related change in the length of same, the balls 15 roll in the inner running grooves 10 and in the outer running grooves 5. As can be seen in FIG. 2, during the moving-in motion, the rolling displacement path is delimited in that the cage 16 of the plunging unit 2 stops against the stop face 6 of the outer running grooves 5. The cage comprises a radial projection which stops the cage against the track end. During the moving-out motion, the rolling displacement path is delimited in that the balls facing the bore aperture stop against the securing ring 9 of the outer part 3. That is, the first moving-in stop 6 and the first moving-out stop 9 delimit the effective length of the outer running grooves 5 with respect to the path which can be covered by the plunging unit 2 relative to the outer part 3. Furthermore, the second moving-in stop 12 and the second moving-out stop 11 delimit the effective length of the inner running grooves 10 with respect to the path which can be covered by the plunging unit 2 relative to the inner part 1. Because, during the moving-in motion, the cage 16 comes to rest against the stop face 6 of the outer part 3 and because, furthermore, there exists a distance between the stop face 6 and the directly adjoining balls 15, the balls 15 and thus the plunging unit 2 are prevented from being jammed in between the inner part 1 and the outer part 3. On the contrary, during a subsequent moving-in motion, the plunging unit 2 is returned into its starting position.

Because the delimited path (shown as $W_I$ in FIG. 4) to be covered by the plunging unit 2 relative to the inner part 1 is longer than double the delimited path (shown as $W_A$) to be covered by the plunging unit 2 relative to the outer part 3, the inner part 1 is permitted to be displaced relative to the outer part 3, which displacement path extends beyond the rolling displacement path. During the moving-in motion, after the plunging unit 2 has come to rest against the stop face, there occurs a sliding movement between the balls 15 of the plunging unit 2, which is now immovable relative to the outer part 3, and the inner part 1. This sliding displacement path is delimited by the second securing ring 12 of the inner part 1 in that it stops against the cage 16 of the plunging unit 2. As can be seen in FIG. 3, the plunging unit 2 is jammed in between the second securing ring 12 of the inner part 1 and the stop face 6 of the outer part. The inner part 1 cannot move any further into the outer part 3.

On the other hand, as can be seen in FIG. 4, during the sliding moving-out motion, the plunging unit 2 is jammed in between the securing ring 9 of the outer part 3 on the one hand and the first securing ring 11 of the inner part 1 on the other hand. When this position is reached, the inner part cannot move any further out of the outer part 3. For dismantling purposes, the securing ring 9 of the outer part 3 can be removed so that it is possible to pull the inner part, together with the plunging unit 2, out of the outer part 3.

FIG. 5 shows a plunging assembly wherein the length of the outer running grooves 50 is greater than that of the inner running grooves 100. In such an embodiment, the setting movement takes place in the outer joint part 3, i.e. the inner part 1 is axially firmly connected to a drive unit of a motor vehicle, and when the driveshaft is in operation, the outer part 3 can axially move relative to the inner part 1. When the rolling displacement path between the inner part 1 and the outer part 3 has been covered and when the plunging unit 2 has either stopped against the second moving-in stop 12 or against the second moving-out stop 11, there starts a sliding movement between the balls 15 of the plunging unit 2 and the outer part 3. A plate metal cup 22 seals the outer part 3 at the bore end and thus prevents lubricant from escaping.

FIG. 6 shows the cross-section of an inner part having a securing ring 11, 12. The latter engages the groove 13, 14 of the inner part and serves as a stop for the balls 15 or the cage 16 of the plunging unit 2.

FIG. 7 shows a driveshaft 18 for transmitting a torque, especially in the driveline of a motor vehicle, said driveshaft 18 having an inventive plunging assembly which comprises an inner part 1, an outer part 3 and a plunging unit 2. The driveshaft 18 comprises two articulatable joints 19, 20 which are connected to one another by a connecting shaft 21. The plunging assembly forms part of said connecting shaft 21. A convoluted boot is connected to the joint 20 on the one hand and to the connecting shaft 21 on the other hand and seals the plunging assembly outwardly, so that the lubricant contained therein cannot escape.

FIGS. 8 and 9 show a plunging assembly according to FIGS. 1, 3, 4 and 5, with the moving-out stop, however, being provided in the form of annular element 22. Identical components have been given the same reference numbers and are described in connection with FIGS. 1, 3, 4 and 5.

The annular element 22 is arranged co-axially around the longitudinal axis at that end of the outer part 3 from which the inner part 1 projects. The annular element comprises a cylindrical portion 23 which is accommodated in a circumferential groove 24. At the end of the outer part 3, the annular element 22 changes into a circular-ring-shaped portion 25 which projects inwardly beyond the wall 7 of the outer part. The circular-ring-shaped portion 25 thus forms the stop for the cage 16.

FIG. 9 shows an annular element 22' which also comprises a cylindrical portion 23' as well as a circular-ring-shaped portion 25'. The circular-ring-shaped portion 25' changes into a further cylindrical portion 26' which serves as a seat for the convoluted boot 27.

From the foregoing, it will be seen that there has been brought to the art a new and improved plunging assembly for a driveshaft. While the invention has been disclosed in connection with one or more embodiments, it will be understood that the invention is not limited to those embodiments. On the contrary, the invention covers all alternatives, modifications, and equivalents as may be included in the spirit and scope of the appended claims.

What is claimed is:

1. A plunging assembly for a driveshaft, comprising:
    an outer part (3) defining a bore (4) and including a longitudinal axis (x), the bore (4) including circumferentially distributed outer running grooves (5) which extend parallel to the longitudinal axis (x);
    an inner part (1) whose outer face is provided with inner running grooves (10) which extend parallel to the longitudinal axis (x) and which are positioned opposite the outer running grooves (5);
    a plunging unit (2) comprising a cage (16) which is sleeve-shaped, which is arranged co-axially around the inner part (1), which is positioned in the bore (4) so as to be displaceable relative to the outer part (3) and inner part (1) and which, in accordance with the pairs of opposed outer running grooves (5) and inner running grooves (10), comprises apertures (17), as well as balls (15) which are held in the apertures (17) and engage the outer running grooves (5) and the inner running grooves (10); and
    a first moving-in stop (6) and a second moving-in stop (12) for delimiting the path which can be covered by the inner part (1) relative to the outer part (3) during the moving-in motion, and a first moving-out stop (9, 22, 22') and a second moving-out stop (11) for delimiting the path which can be covered by the inner part (1) relative to the outer part (3) during the moving-out motion;
    wherein the first moving-in stop (6) and the first moving-out stop (9, 22, 22') delimit the effective length of the outer running grooves (5) with respect to the path which can be covered by the plunging unit (2) relative to the outer part (3), and wherein the second moving-in stop (12) and the second moving-out stop (11) delimit the effective length of the inner running grooves (10) with respect to the path which can be covered by the plunging unit (2) relative to the inner part (1), the length of the finer running grooves (10) being different from the length of the outer running grooves (5); and
    wherein the first moving-in stop (6) for the plunging unit (2) is formed by stop faces delimiting the end of the outer running grooves (5) in the outer part (3), and the cage (16), in the moved-in condition of the plunging unit (2), is supported on the first moving-in stop (6) in such a way that a gap exists between the stop faces of the outer running grooves and the balls (15) directly adjoining the stop faces.

2. The plunging assembly according to claim 1 wherein a first delimited path ($W_I$) which can be covered by the plunging unit (2) relative to the inner part (1) is longer than a second delimited path ($W_A$) which can be covered by the plunging unit (2) relative to the outer part (3).

3. The plunging assembly according to claim 1 wherein the first moving-out stop (9) comprises a securing ring adopted to be inserted into the bore (4) of the outer part (3) for stopping the cage (16) or the balls (15) of the plunging unit (2).

4. The plunging assembly according to claim 1 wherein the first moving-out stop comprises an annular element (22, 22') which is arranged at an end of the outer part (3) into which the inner part (1) is inserted and which comprises a circular-ring-shaped stop face (25, 25') which points radially inwardly.

5. The plunging assembly according to claim 4, wherein the annular element (22, 22') is produced by a non-cutting shaping method.

6. The plunging assembly according to claim 5, wherein the annular element (22, 22') is formed on to the outer part (3) by a rolling operation.

7. The plunging assembly according to claim 4 wherein the annular element (22') comprises a seat (26') for a convoluted boot (27).

8. The plunging assembly according to claim 1 wherein the second moving-in stop (12) comprises a securing ring which is secured to an end of the inner running grooves (10) of the inner part (1) which emerges from the outer part (3) and which serves as a stop for the cage (16) or the balls (15) of the plunging unit (2) and is arranged in front of the end of the inner running grooves (10).

9. The plunging assembly according to claim 1 wherein the second moving-out stop (11) comprises a securing ring which is connected to an end of the inner part (1) which is positioned in the outer part (3) and which serves as a stop for the cage (16) or the balls (15) of the plunging unit (2) and which is arranged in front of an end of the inner running grooves (10).

10. The plunging assembly according to claim 1 comprising a means for sealing the bore (4) of the outer part (3).

* * * * *